(12) United States Patent
Connell

(10) Patent No.: US 8,583,492 B2
(45) Date of Patent: Nov. 12, 2013

(54) CHECK PROCESSING AND FUNDS VERIFICATION

(75) Inventor: Andrea M. Connell, East Bridgewater, MA (US)

(73) Assignee: Bank of America Corporation, Charlotte, NC (US)

( * ) Notice: Subject to any disclaimer, the term of this patent is extended or adjusted under 35 U.S.C. 154(b) by 396 days.

(21) Appl. No.: 12/837,567

(22) Filed: Jul. 16, 2010

(65) Prior Publication Data

US 2012/0016755 A1 Jan. 19, 2012

(51) Int. Cl.
*G06Q 20/00* (2012.01)
*G06Q 40/00* (2012.01)

(52) U.S. Cl.
USPC ............................................. 705/16; 705/45

(58) Field of Classification Search
USPC ....................................................... 705/16, 45
See application file for complete search history.

(56) References Cited

U.S. PATENT DOCUMENTS

| | | | | |
|---|---|---|---|---|
| 5,412,190 A * | 5/1995 | Josephson et al. | ............... | 705/45 |
| 6,189,785 B1 * | 2/2001 | Lowery | ........................... | 235/379 |
| 6,243,689 B1 * | 6/2001 | Norton | .............................. | 705/18 |
| 6,554,185 B1 * | 4/2003 | Montross et al. | .............. | 235/379 |
| 7,090,122 B1 * | 8/2006 | Warren et al. | ................. | 235/379 |
| 7,137,551 B1 * | 11/2006 | Crews et al. | ................... | 235/379 |
| 7,207,478 B1 * | 4/2007 | Blackson et al. | ............. | 235/379 |
| 8,195,570 B1 * | 6/2012 | Barron et al. | .................. | 705/45 |
| 2002/0042773 A1 * | 4/2002 | Fugitte et al. | ................... | 705/39 |
| 2002/0152179 A1 * | 10/2002 | Racov | .............................. | 705/67 |
| 2006/0049242 A1 * | 3/2006 | Mejias et al. | ................. | 235/379 |
| 2006/0074799 A1 * | 4/2006 | Averyt et al. | ................... | 705/40 |
| 2006/0074803 A1 * | 4/2006 | Crowell et al. | ................. | 705/40 |
| 2006/0144923 A1 * | 7/2006 | VanKirk et al. | ............... | 235/379 |
| 2007/0094095 A1 * | 4/2007 | Kilby | .............................. | 705/26 |
| 2008/0021803 A1 * | 1/2008 | Ahles et al. | ..................... | 705/35 |
| 2008/0109324 A1 * | 5/2008 | Rosmarin et al. | .............. | 705/26 |
| 2008/0147561 A1 * | 6/2008 | Euchner et al. | ................. | 705/64 |
| 2009/0254447 A1 * | 10/2009 | Blades | ............................ | 705/26 |
| 2009/0327133 A1 * | 12/2009 | Aharoni et al. | ................. | 705/44 |
| 2010/0078471 A1 * | 4/2010 | Lin et al. | ....................... | 235/379 |
| 2010/0316204 A1 * | 12/2010 | Loeb et al. | ............... | 379/114.03 |

* cited by examiner

*Primary Examiner* — Seye Iwarere
(74) *Attorney, Agent, or Firm* — Banner & Witcoff, Ltd.; Michael A. Springs

(57) ABSTRACT

A system and method of verifying sufficient funds in an account associated with a negotiable instrument, such as a check, money order, traveler's check, and the like, received for payment is provided. The verification of funds may be provided prior to accepting the check as payment. In some examples, the check may be scanned into a funds verification system at a back office or front end system, such as a check out lane, point of sale system, and the like, of a merchant, vendor, service provider, and the like receiving the check for payment. The scanned image of the check may be transmitted to a financial institution associated with the merchant, vendor, service provider, and the like and the financial institution may verify that sufficient funds exist. If sufficient funds exist, the check may be deposited into an account of the vendor, merchant, service provider, and the like at the financial institution.

20 Claims, 7 Drawing Sheets

CHECK PROCESSING AND FUNDS VERIFICATION

BACKGROUND

With today's current economic climate, vendors, merchants, service providers, and the like are looking for ways to ensure payment of goods and services. For instance, current systems may allow a user to remit payment via a negotiable instrument, such as a check, however, the merchant, service provider, vendor, and the like receiving the check may not be able to confirm that sufficient funds are available to cash the check until the check is deposited, processed, and the like. At that point, various costs may have been incurred for processing the check with inadequate funds, the user may not be readily available with an alternate form of payment, and the like. This leads to inefficiencies in processing payment, late receipt of payment, and the like which can all negatively impact the financial state of the merchant, vendor, service provider, and the like. Accordingly, a system and method of confirming the existence of sufficient funds in an account associated with the check prior to accepting the check as payment for goods and/or services would be advantageous.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects, a system and method of verifying funds associated with a negotiable instrument, such as a check, money order, traveler's check, check item, and the like, prior to accepting the instrument as payment are provided. In some examples, the check may be received at a back office of a merchant, vendor, service provider, and the like receiving payment for goods and/or services. The check or other negotiable instrument may be scanned into a funds verification system at the back office of the merchant, vendor, service provider, and the like. In some arrangements, check data may be input into the funds verification system. The check data and/or scanned image of the check may be transmitted to a financial institution associated with the merchant, vendor, service provider, and the like. The financial institution may confirm that sufficient funds are available in an account associated with the check to cash the check and may transmit this information to the back office funds verification system. The check may then be accepted as payment and may be deposited into an account of the merchant, vendor, service provider, and the like at the financial institution, either upon acceptance of the check as payment or at a predetermined time (batch transaction).

In some examples, one or more reports may be generated at the funds verification system at the back office of the merchant, vendor, service provider, and the like. The reports may include transaction histories, customer payment histories, and the like. In some arrangements, data may be stored at the funds verification system and may allow item research.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
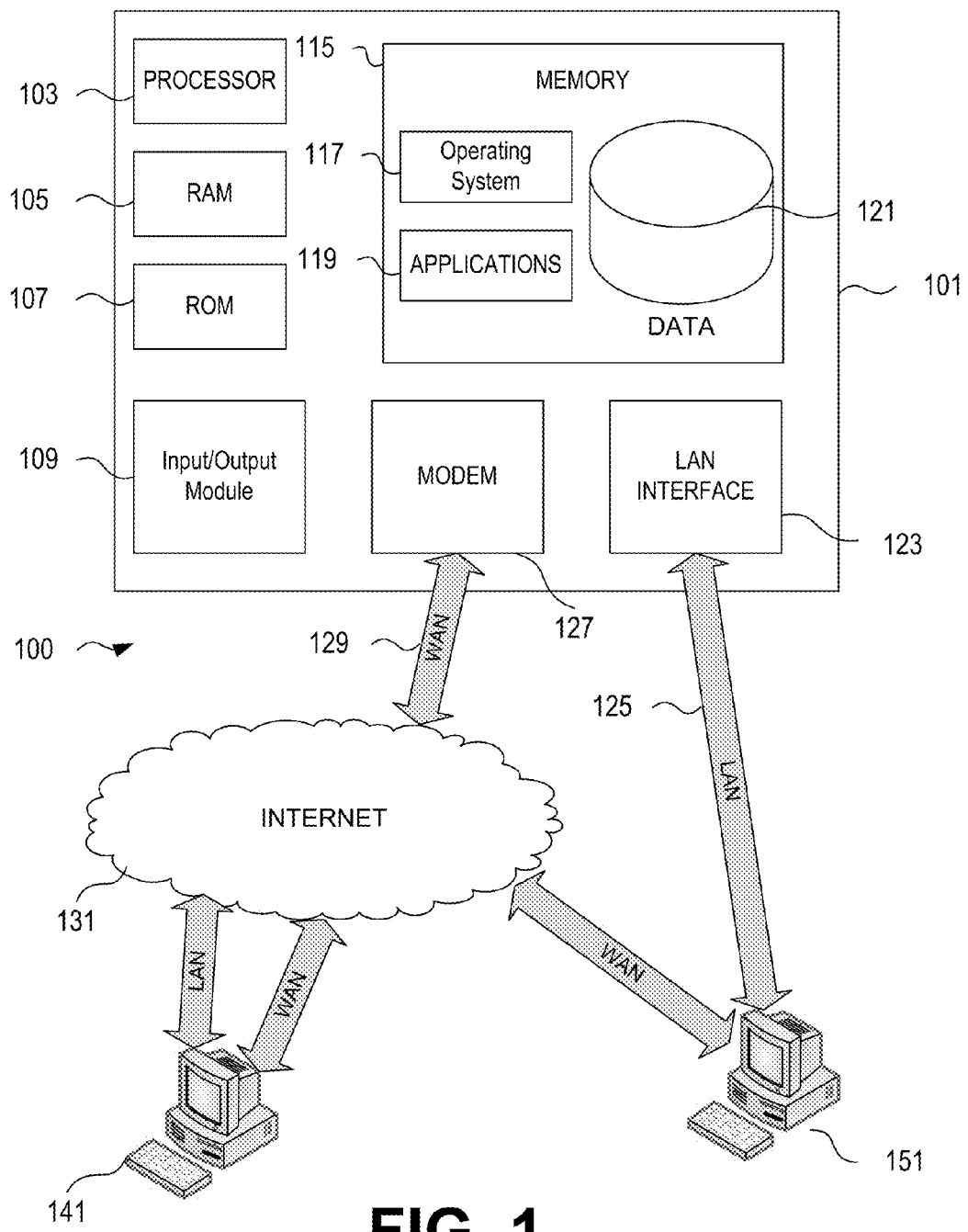
FIG. 1 illustrates an example of a suitable operating environment in which various aspects of the disclosure may be implemented.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 may be connected to the LAN 125 through a network interface or adapter 123.

When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

The above-described systems may be used in back office funds verification systems, as will be described below. For instance, various computing systems (including hardware, software, firmware, and the like) may be used to scan a negotiable instrument, such as a check, money order, traveler's check, check item, and the like received for payment for goods and/or services at a merchant, vendor, service provider, and the like. Although various negotiable instruments may be used in conjunction with the systems and methods described herein, the systems and methods will be described in conjunction with a check and nothing in the specification should be viewed as limiting the invention to use with a check.

In some examples, prior to accepting the check as payment, the merchant, vendor, service provider, and the like may transmit the scanned image of the check, and/or various check data, to a financial institution associated with the merchant, vendor, service provider, and the like to confirm that sufficient funds are available to cash the check. Upon verifying that sufficient funds are available, the check may be accepted as payment and may be deposited into an account of the merchant, vendor, service provider, and the like at the financial institution.

Figure 2:
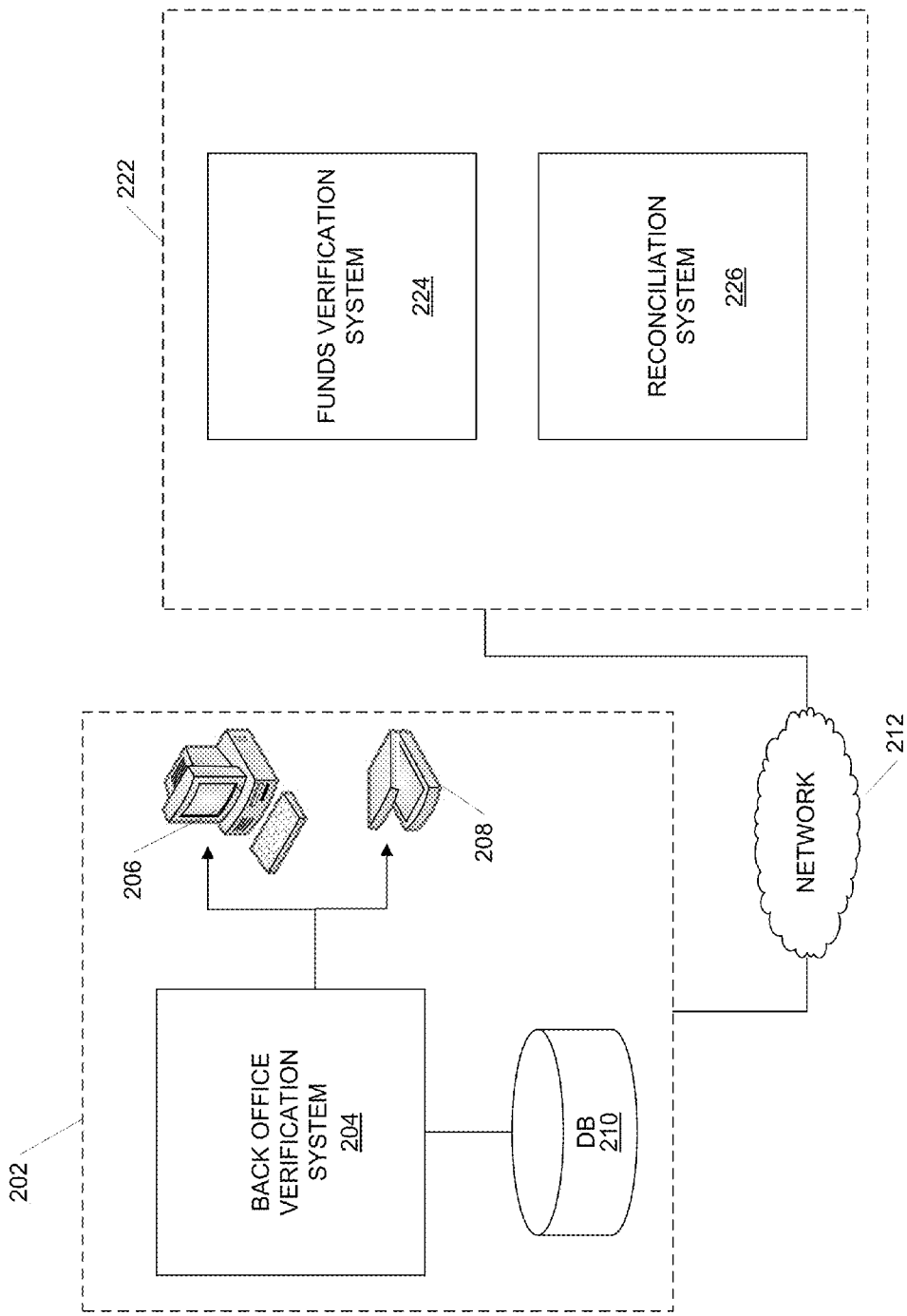
FIG. 2 illustrates an example system for verifying sufficient funds exist in an account associated with a check received for payment according to one or more aspects described herein.

FIG. 2 illustrates one example verification system 200 in which verification of funds may be performed prior to completing a transaction, accepting payment (such as a check) for a transaction, and the like. That is, prior to accepting a check as payment for goods, services, and the like, a merchant or other entity may be able to confirm the availability of sufficient funds in an account associated with the check, or another account associated with the user of the check. The system 200 may include a retail or service provider portion 202 located at the merchant, vendor, service provider, and the like, that may include a retail funds verification system 204. The retail funds verification system may be located at a back office of a merchant, vendor, retail store, and the like and/or may be located at a front end, such as a front office, check out lane, and the like. The retail funds verification system 204 may include a computing device 206 (such as a laptop, desktop, and the like) and a scanner 208. The scanner 208 may be used to scan checks that are being used as a form of payment for goods, services, and the like. The computing device 206 may provide an interface for entering data, scanning checks, viewing scanned checks, processing payments, and the like, as well as for communicating with the financial institution portion 222. In some examples, the retail or service provider portion 202 may include a database 210 which may store information, such as check images, customer data, and the like, as will be discussed more fully below.

As mentioned above, the retail or service provider portion 202 may be housed within a back office of a merchant, retailer, service provider, and the like. For instance, the retail or service provider portion 202 may be housed at a real estate firm, law firm, household services provider such as a plumber, construction worker, and the like, and the like. Although some example locations are mentioned, the retail or service provider portion 202 may be housed at and used by any merchant, retailer, service provider, and the like who accepts checks as a form of payment for goods or services. Additionally or alternatively, the retail or service provider portion 202 may be housed at a front end of the retailer, merchant, and the like. For instance, the retail funds verification system 204 may be located at a payment point, such as a check out lane or other point of sale system, such that verification of funds may be provided prior to a customer or client leaving the payment point.

The retail or service provider portion 202 may be in communication with a financial institution portion 222. The financial institution portion 222 may be housed at a financial institution, such as a bank. In some examples, the retail or service provider portion 202 and the financial institution portion may be connected and/or in communication via a network 212, such as the Internet. For instance, the retail or service provider portion 202 may access the financial institution portion 222 to verify sufficient funds are available for the scanned check being used as payment. Access to the financial institution portion may be via the financial institutions website (such as a web banking site) or via a client portal supplied by the financial institution. The financial institution portion 222 may include a funds verification system 224 that may include one or more computing devices. The funds verification system 224 may receive an image of the scanned check transmitted from the retail funds verification system 204 and may confirm that sufficient funds exist in the account associated with the check. The financial institution portion 202 may also include a reconciliation system 226 that may reconcile checks used as payment via the verification system 200.

Figure 3:
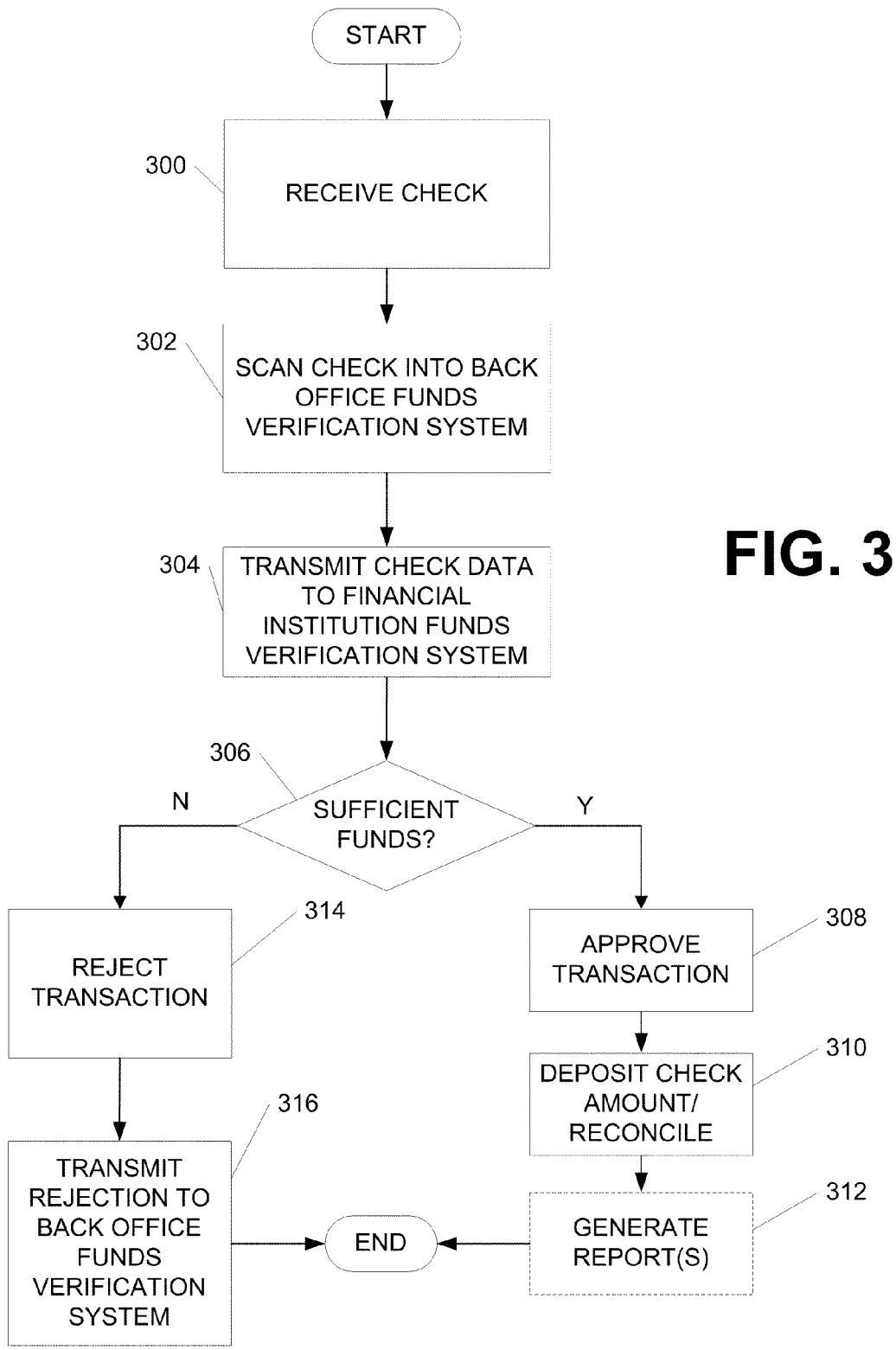
FIG. 3 illustrates one example method of verifying sufficient funds exist in an account associated with a check received for payment according to one or more aspects described herein.

FIG. 3 illustrates one example method of verifying that sufficient funds exist in an account associated with a check being used for payment prior to accepting the check. For instance, the determination that sufficient funds exist may be performed prior to the payor (the person submitting the check as payment) being given confirmation of payment, such as a receipt, and the like. Additionally or alternatively, the determination that sufficient funds exist may be performed prior to the payor leaving the merchant, vendor, service provider, and the like in the case of an in-person payment. In step 300, a check is received, for instance, at a vendor, merchant, service provider, and the like, as payment for goods or services. Prior to accepting the check as payment, the vendor, service provider, merchant, and the like receiving the check as payment may want to verify that sufficient funds are available in an account associated with the check to cover the amount of the check. Accordingly, the check may be scanned into the verification system (such as system 200 in FIG. 2) in step 302. The check may be scanned in at a retail funds verification system associated with the vendor, service provider, merchant, and the like accepting the check as payment, as described above. In some examples, once the check is scanned in, the physical check may be retained at the vendor, service provider, merchant, and the like for a predetermined time, while the image of the scanned check may be stored in a database at the vendor, service provider, merchant, and the like. In some arrangements, this historical information may be used to generate various reports, as will be discussed more fully below.

In step 304, check data is transmitted to the financial institution funds verification system. The check data may include an amount of the check, name on the check, account number associated with the check, routing number of the financial institution associated with the check, an image of the scanned check, and the like. The check data may be input at a computing device at the retail funds verification system of the merchant, vendor, service provider, and the like receiving the check as payment. In some examples, the image of the check and/or associated check data may be stored at the financial institution for a predetermined time period.

Once the check image and/or check data is received at the financial institution funds verification system, a determination is made in step 306 as to whether sufficient funds exist in the account associated with the check in order to cash the check and thus accept the check as payment. If inadequate funds exist in step 306, the transaction may be rejected in step 314 and the rejection/notification of inadequate funds may be transmitted to the retail funds verification system in step 316. If sufficient funds exist in step 306, the check may be accepted as payment for goods, services, and the like and the transaction may be approved in step 308. In step 310, the check may be deposited and/or the amount of the check reconciled with the account. In some examples, the amount may be deposited upon approval of the transaction. This deposit may be performed automatically without any additional user interaction. Alternatively, one or more accepted checks may be held until a predetermined time (such as noon, 5:00 p.m., and the like) or until a predetermined time has lapsed (every 4 hours, every 8 hours, every 12 hours, and the like). In still other examples, the checks may be held until a predetermined number of checks have been approved and the batch would then be deposited and reconciled upon reaching the number of checks threshold.

In step 312, one or more reports may be generated by the validation system. For instance, reports may be generated providing client payment history based on client identification, time period, and the like. In some examples, historical data may be stored for several years (e.g., 5 years, 7 years, and the like) to provide a longer reaching view of the history of the client. Data for generating the reports may be stored in a database (such as database 210).

Figure 4:
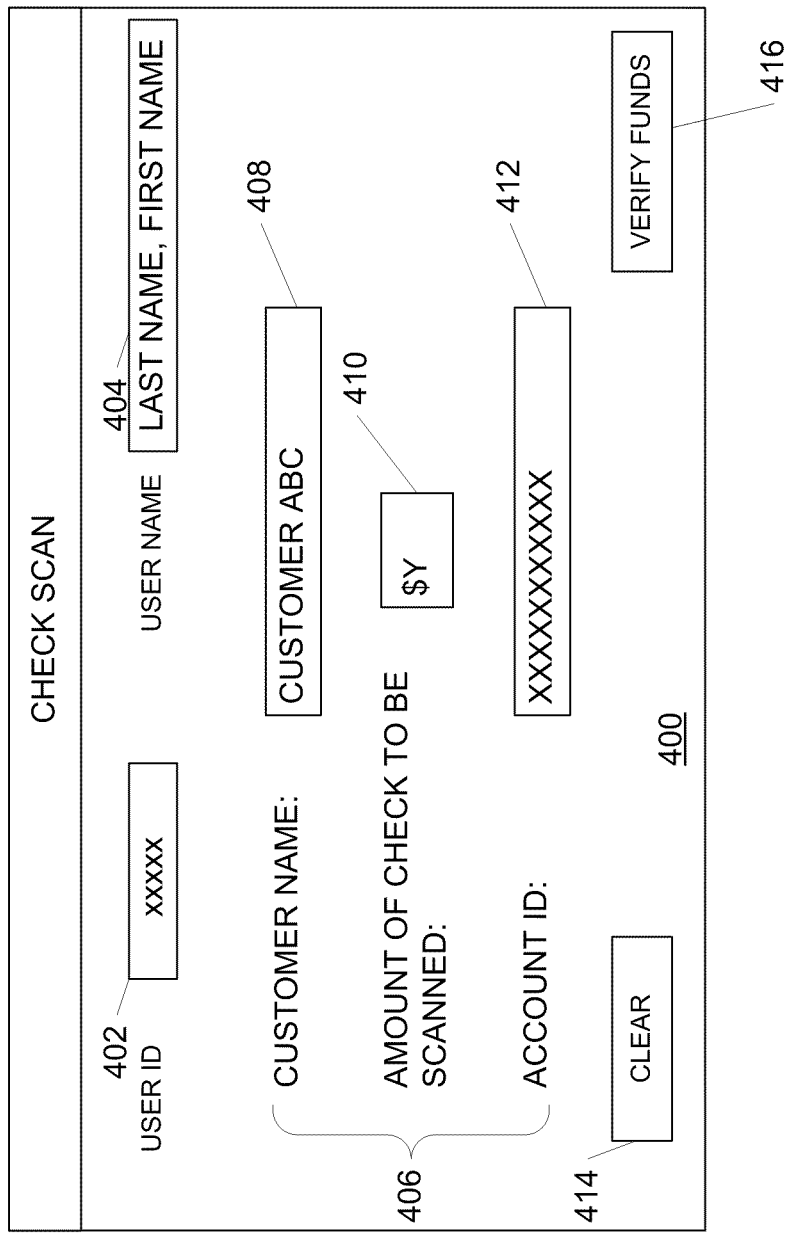
FIG. 4 illustrates one example user interface for receiving the check and/or check data at a back office funds verification system according to one or more aspects described herein.

FIG. 4 illustrates one example user interface 400 associated with scanning a check and entering check data. In some examples, the user interface may be accessed via a client access portal provided by the financial institution housing the funds verification system over a network. The user interface 400 includes a user identification field 402 in which a user (such as an employee of the vendor, service provider, merchant, and the like receiving the check as payment) may enter a unique identifier, such as an employee identification code, and the like. Field 404 provides the name of the user. Check data 406 includes the customer name, amount of the check, and an account identifier. Check data may also include additional information not shown, such as a routing number associated with the financial institution associated with the check, check number, and the like. The user interface 400 includes fields 408, 410, and 412 for inputting check data including customer name, amount of check and account identifier, respectively. Once the appropriate data is input, and the check is scanned in, the funds may be verified by selecting verify funds option 416. Alternatively, a clear option 414 is provided which may clear all entered data.

Figure 5:
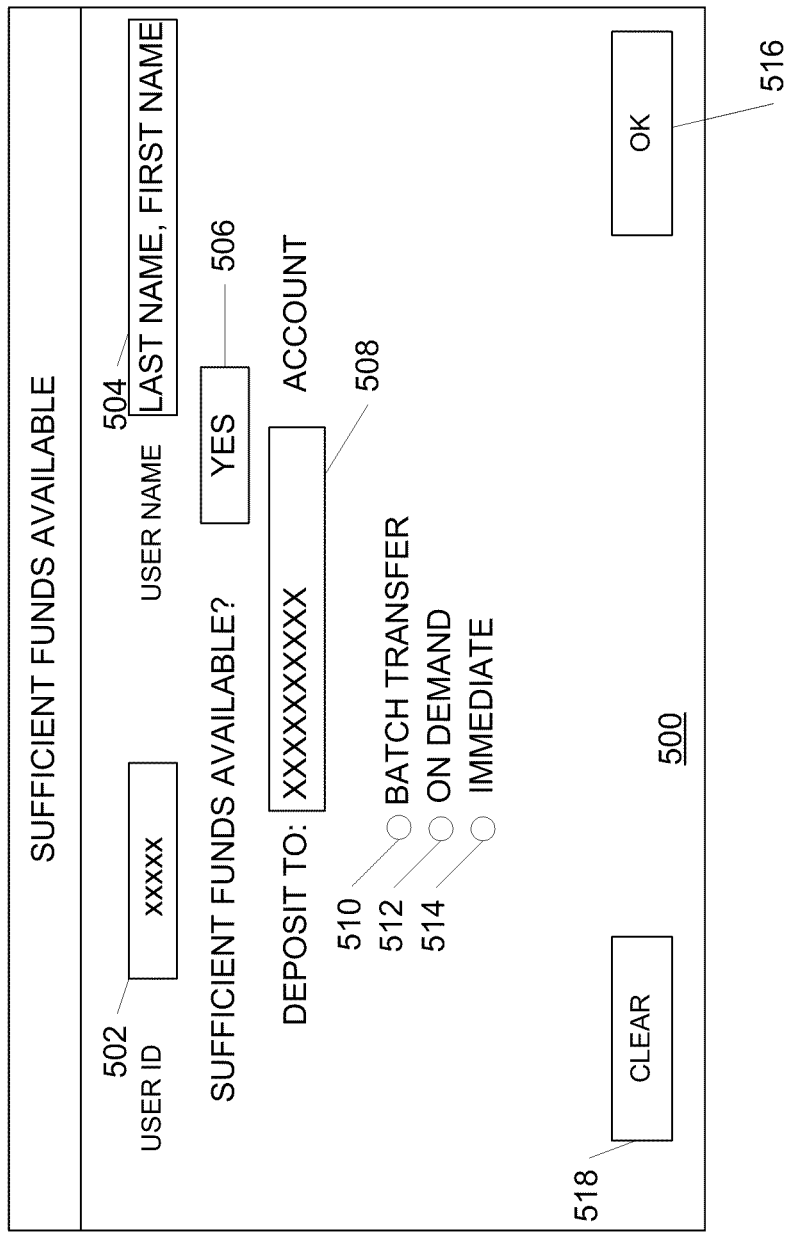
FIG. 5 illustrates example user interface for depositing a check upon receiving verification that sufficient funds are available according to one or more aspects described herein.

FIG. 5 illustrates another user interface 500 that may be provided when the funds have been verified and sufficient funds are available to cash the check. Similar to interface 400, a user identification field 502 and user name field 504 are provided. In field 508, there appears an indication that sufficient funds are available to cash the scanned check. Interface 500 also may include an account identification field 508 in which a user may indicate the account to which the funds associated with the check should be deposited. For instance, account identification field 508 may include an account associated with the vendor, service provider, merchant, and the like receiving the check and may be a checking account, savings account, business checking account, and the like As discussed above, deposit of the check (and/or reconcilement of the check) may be performed immediately upon acceptance of the check and approval of the transaction or may be performed in batches or on demand. A user may select a radio button 510, 512, 514 associated with the desired timing or method of deposit. Alternatively, the desired timing/method of deposit may be selected from a drop-down menu. Once the information is input, the user may select ok option 516 to process the transaction. Alternatively, the user may select clear option 518 to clear any information input.

Figure 6:
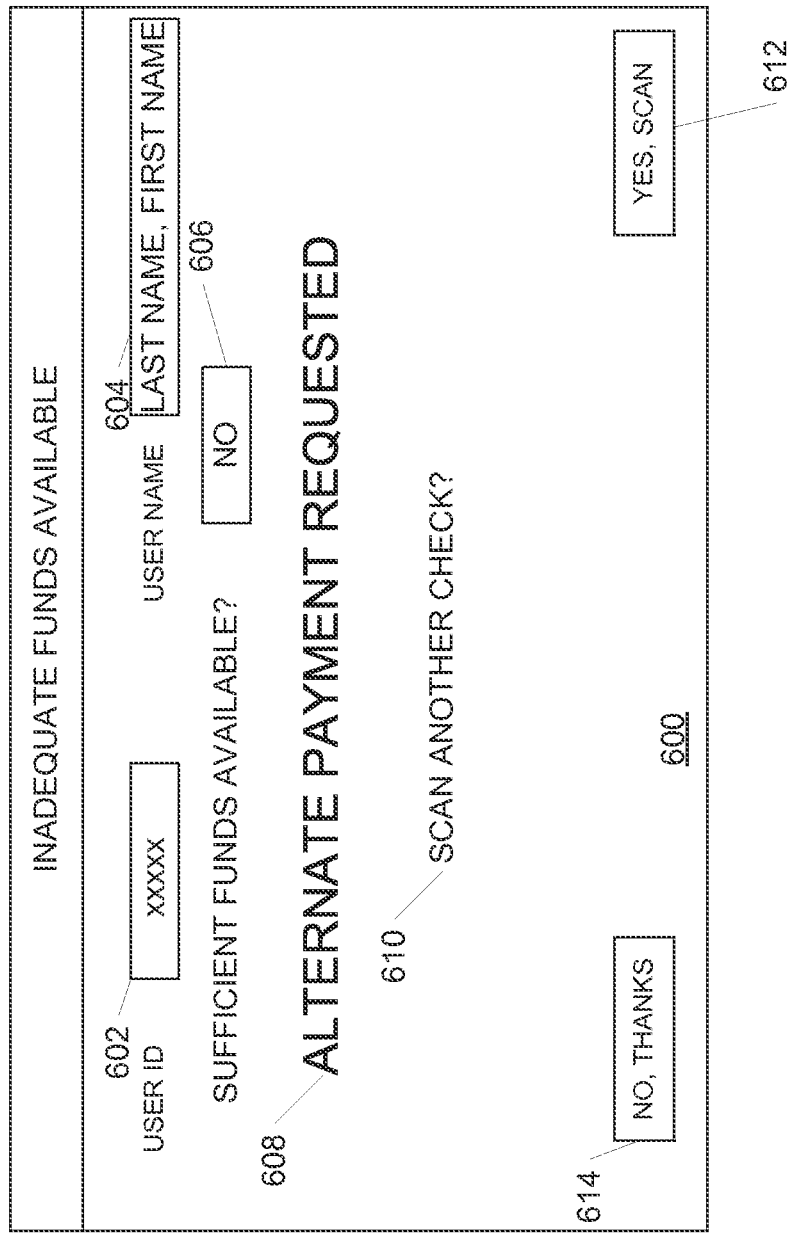
FIG. 6 illustrates one example user interface for rejecting a check and requesting alternate payment upon receiving an indication that sufficient funds are not available according to one or more aspects described herein.

FIG. 6 illustrates an example user interface 600 that may be provided upon a determination that inadequate funds are available. The user identification field 602 and user name field 604 are provided. Field 606 indicates that sufficient funds are not available to cash the check. Accordingly, a notice is provided, such as notice 608, that an alternate method of payment should be requested. Region 610 provides a request to scan another check as the alternate method of payment. If a user desires to scan another check, ok option 612 may be selected. If a user does not wish to scan another check, or another form of payment is being used (such as cash, credit card, and the like) no, thanks option 614 may be selected.

Figure 7:
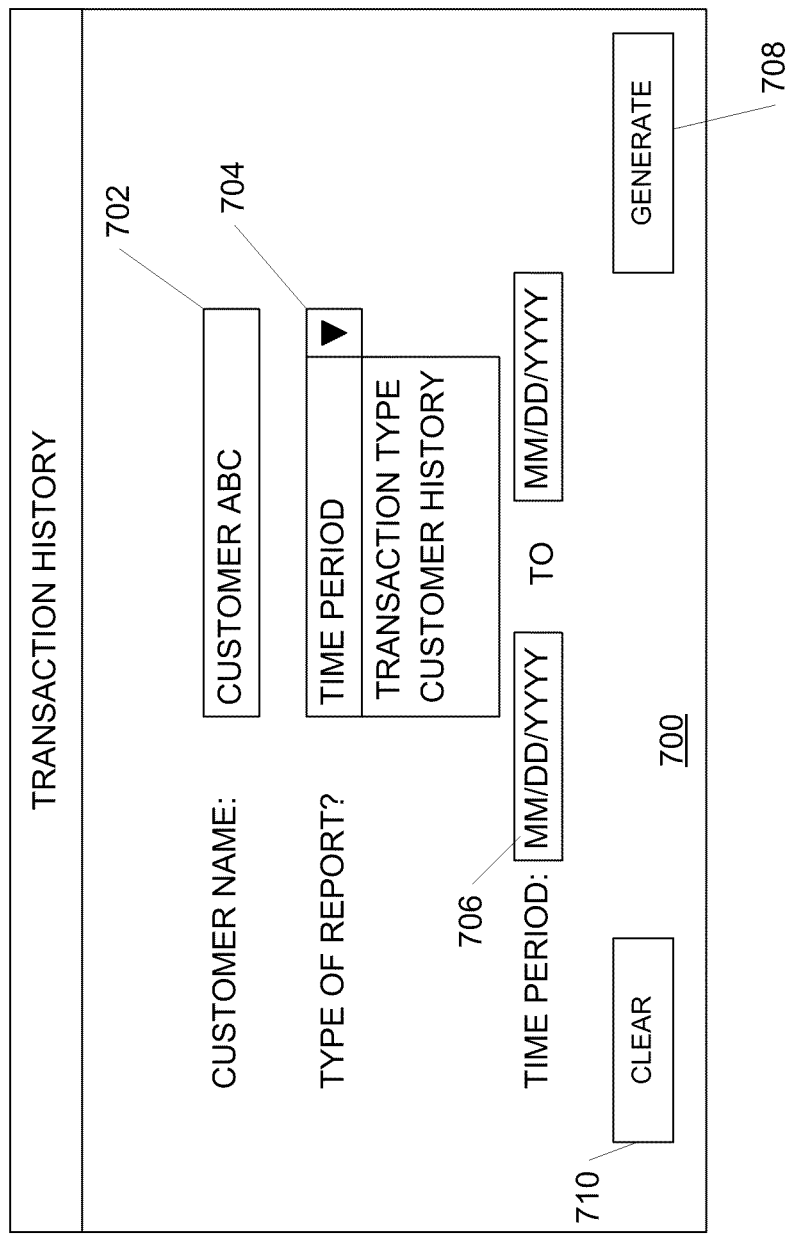
FIG. 7 illustrates one example user interface for generating one or more report at a funds verification system according to one or more aspects described herein.

FIG. 7 provides one example user interface 700 for generating reports from the funds verification system. The interface 700 may include a field 702 to indicate the customer name for which the report should be generated. Field 704 provides a field in which the type of report may be selected. For instance, a time period, transaction history, or customer history report may be generated. The desired report may be selected from a drop-down menu, as shown in FIG. 7. If a time period type report is selected, the desired time period may be input in field 706. The user may then select the generate report option 708. Alternatively, a user may select clear option 710 to clear all data input into the interface.

In some examples, the generated reports may include data, as well as images, such as charts, graphs, and the like showing trends. Additionally or alternatively, the generated reports may include images of the scanned checks. Further, storage of the data, check images, and the like may allow for item research within the system. For instance, customer payment history, and the like may be researched. Additionally or alternatively, information about a past payment may be researched.

One advantage of the described funds verification system is availability of the system 24 hours/day, 7 days/week. For instance, a user may verify funds associated with a check at any time of day. Accordingly, if a user desires to confirm funds after hours for a plurality of checks the system may be available to the user, such as via a client access portal provided by the financial institution. Additionally, the funds are being verified by a financial institution associated with the vendor, service provider, merchant, and the like. Accordingly, if sufficient funds are available, the deposit to the account of the vendor, service provider, merchant, and the like may be performed without any additional user interaction. That is, the deposit will be directly to the financial institution that verified the funds, without any intermediary, such as a transaction clearinghouse, and the like.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

What is claimed is:

1. A method, comprising:
   receiving, in a funds verification system at a location of a recipient of a check, the check from a sender of the check for an amount of payment, the location of the funds verification system being different from a location of a financial institution of the check recipient, said funds verification system comprising at least one computer processor;
   determining, by the at least one computer processor and via the financial institution of the check recipient, whether sufficient funds equal to or greater than the amount of payment exist in an account associated with the check;
   responsive to determining, by the at least one computer processor, that sufficient funds exist in the account associated with the check:
      providing a user interface indicating that sufficient funds exist in the account associated with the check, the user interface indicating that sufficient funds exist in the account associated with the check comprising an account identification field for indicating an account associated with the recipient of the check to which the amount of payment should be deposited and a selectable option for indicating when the amount of payment should be deposited, said selectable option for indicating when the amount of payment should be deposited comprising an option for depositing the amount of payment immediately and an option for depositing the amount of payment when a predetermined threshold number of checks have been approved by said funds verification system;
   accepting the check as payment; and
   depositing the amount of the check into an account of the check recipient at the financial institution, wherein depositing the amount of the check into the account of the check recipient at the financial institution comprises:
      determining if the option for depositing the amount of payment immediately is selected or if the option for depositing the amount of payment when the predetermined threshold number of checks have been approved by said funds verification system is selected;
      responsive to determining that the option for depositing the amount of payment immediately is selected, immediately depositing the amount of payment into an account associated with the recipient of the check indicated via the account identification field; and
      responsive to determining that the option for depositing the amount of payment when the predetermined threshold number of checks have been approved by said funds verification system is selected, delaying depositing of the amount of payment into an account associated with the recipient of the check indicated via the account identification field until the threshold number of checks have been approved by said funds verification system; and
   responsive to determining, by the at least one computer processor, that inadequate funds exist in the account associated with the check, providing a user interface comprising a notice, the notice indicating that an alternate method of payment should be used, and the notice comprising at least one credit card payment option and an option to scan a different check.

2. The method of claim 1, wherein receiving the check includes scanning the check into the funds verification system at the location of the check recipient.

3. The method of claim 1, further including reconciling the check at the financial institution.

4. The method of claim 1, wherein depositing the amount of the check into an account of the check recipient at the financial institution includes holding the check until a predetermined time and depositing the check at the predetermined time.

5. The method of claim 1, further including generating a report at the funds verification system at the location of the check recipient.

6. The method of claim 5, wherein the funds verification system at the location of the check recipient includes data storage for check data and check images.

7. The method of claim 6, wherein the report includes historical data stored in the data storage.

8. The method of claim 6, wherein the data storage stores check data and check images for a predetermined time.

9. The method of claim 1, wherein responsive to determining that inadequate funds exist in the account associated with the check, rejecting the check and transmitting the rejection to the funds verification system at the location of the check recipient.

10. The method of claim 1, wherein the funds verification system at the location of the recipient of the check is located at a point of sale system at a front end of the recipient of the check.

11. One or more non-transitory computer readable media storing computer readable instructions that, when executed, cause a funds verification system to:
   receive, in the funds verification system at a location of a recipient of a check, the check from a sender of the check for an amount of payment, wherein receipt of the check includes receiving a scanned image of the check and wherein the location of the funds verification system is different from a location of a financial institution associated with the check recipient;
   receive, in the funds verification system, data associated with the check;
   transmit the received scanned image and received data associated with the check to the financial institution associated with the check recipient;
   determine, via the financial institution associated with the check recipient, whether sufficient funds equal to or greater than the amount of payment exist in an account associated with the check;
   responsive to determining that sufficient funds exist in the account associated with the check:
      provide a user interface indicating that sufficient funds exist in the account associated with the check, the user interface indicating that sufficient funds exist in the account associated with the check comprising an account identification field for indicating an account associated with the recipient of the check to which the amount of payment should be deposited and a selectable option for indicating when the amount of payment should be deposited, said selectable option for indicating when the amount of payment should be deposited comprising an option for depositing the amount of payment immediately and an option for depositing the amount of payment when a predetermined threshold number of checks have been approved by said funds verification system;
      accept the check as payment;
      determine if the option for depositing the amount of payment immediately is selected or if the option for depositing the amount of payment when the predetermined threshold number of checks have been approved by said funds verification system is selected;
      responsive to determining that the option for depositing the amount of payment immediately is selected, immediately deposit the amount of payment into an account associated with the recipient of the check indicated via the account identification field; and
      responsive to determining that the option for depositing the amount of payment when the predetermined threshold number of checks have been approved by said funds verification system is selected, delay depositing of the amount of payment into an account associated with the recipient of the check indicated via the account identification field until the threshold number of checks have been approved by said funds verification system; and
   responsive to determining that inadequate funds exist in the account associated with the check, provide a user interface comprising a notice, the notice indicating that an alternate method of payment should be used, and the notice comprising at least one credit card payment option and an option to scan a different check.

12. The one or more non-transitory computer readable media of claim 11, wherein the computer readable instructions further cause the funds verification system to hold the check until a predetermined time and deposit the check at the predetermined time.

13. The one or more non-transitory computer readable media of claim 11, wherein the computer readable instructions further cause the funds verification system to generate a report at the funds verification system at the location of the check recipient.

14. The one or more non-transitory computer readable media of claim 13, wherein the report includes historical data stored in a data storage at the funds verification system.

15. The one or more non-transitory computer readable media of claim 11, wherein responsive to determining that inadequate funds exist in the account associated with the check, reject the check and transmit the rejection to the funds verification system at the check recipient.

16. An apparatus comprising:
   a processor; and
   memory operatively coupled to the processor and storing computer readable instructions that, when executed, cause the apparatus to:
      receive, in a funds verification system at a location of a recipient of a check, the check from a sender of the check for an amount of payment, wherein receipt of the check includes receiving a scanned image of the check and wherein the location of the funds verification system is different from a location of a financial institution associated with the check recipient;
      receive, in the funds verification system, data associated with the check;
      transmit the received scanned image and received data associated with the check to the financial institution associated with the check recipient;
      determine, via the financial institution associated with the check recipient, whether sufficient funds equal to or greater than the amount of payment exist in an account associated with the check;
      responsive to determining that sufficient funds exist in the account associated with the check:
         provide a user interface indicating that sufficient funds exist in the account associated with the check, the user interface indicating that sufficient funds exist in the account associated with the check comprising an account identification field for indicating an account associated with the recipient of the check to which the amount of payment should be deposited and a selectable option for indicating when the amount of payment should be deposited, said selectable option for indicating when the amount of payment should be deposited comprising an option for depositing the amount of payment immediately and an option for depositing the amount of payment when a predetermined threshold number of checks have been approved by said funds verification system;
         accept the check as payment;
         determine if the option for depositing the amount of payment immediately is selected or if the option for depositing the amount of payment when the predetermined threshold number of checks have been approved by said funds verification system is selected;
         responsive to determining that the option for depositing the amount of payment immediately is selected, immediately deposit the amount of payment into an account associated with the recipient of the check indicated via the account identification field; and responsive to determining that the option for depositing the amount of payment when the predetermined threshold number of checks have been approved by said funds verification system is selected, delay depositing of the amount of payment into an account associated with the recipient of the check indicated via the account identification field until the threshold number of checks have been approved by said funds verification system; and responsive to determining that inadequate funds exist in the account associated with the check, provide a user interface comprising a notice, the notice indicating that an alternate method of payment should be used, and the notice comprising at least one credit card payment option and an option to scan a different check.

17. The apparatus of claim 16, wherein the computer readable instructions further cause the apparatus to hold the check until a predetermined time and deposit the check at the predetermined time.

18. The apparatus of claim 16, wherein the computer readable instructions further cause the apparatus to generate a report at the funds verification system at the location of the check recipient.

19. The apparatus of claim 18, wherein the report includes historical data stored in a data storage at the funds verification system.

20. The apparatus of claim 16, wherein responsive to determining that inadequate funds exist in the account associated with the check, reject the check and transmit the rejection to the funds verification system at the check recipient.

* * * * *